May 5, 1970     S. C. COOK     3,510,083
FISHING REEL
Filed July 5, 1968     2 Sheets-Sheet 1
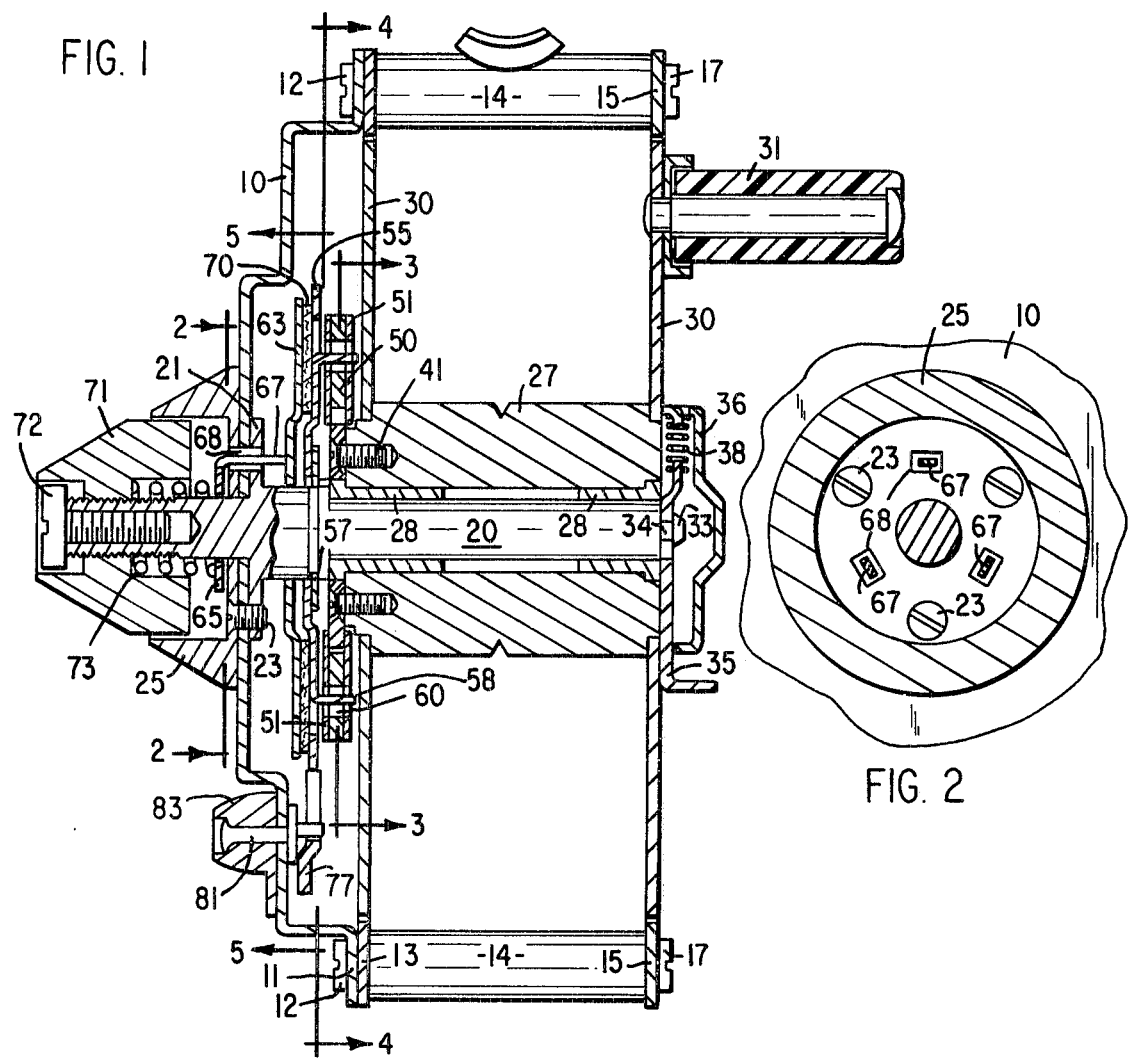
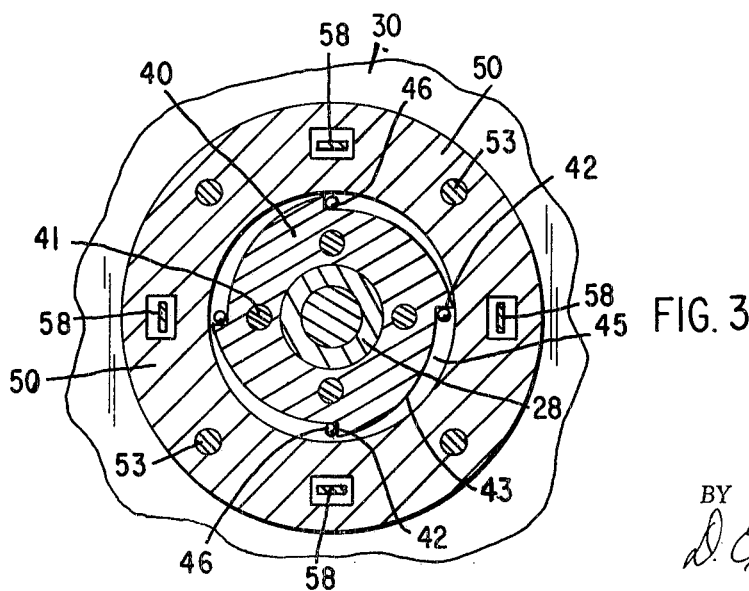
INVENTOR.
SIDNEY C. COOK.
BY
D. Emmett Thompson
ATTORNEY INVENTOR.
SIDNEY C. COOK.
BY
D. Emmett Thompson
ATTORNEY.

United States Patent Office 3,510,083
Patented May 5, 1970

3,510,083
FISHING REEL
Sidney Charles Cook, Ilion, N.Y., assignor to Martin Reel Company, Inc., Mohawk, N.Y., a corporation of New York
Filed July 5, 1968, Ser. No. 742,580
Int. Cl. A01k 89/02
U.S. Cl. 242—84.51                 3 Claims

ABSTRACT OF THE DISCLOSURE

A fishing reel spool is connected through a one-way positive clutch to an adjustable friction brake to retard unwinding of the line, but allowing free rotation thereof in the winding direction. The spool is mounted on one end of a shaft in a housing and is connected directly to one element of a wedge-type, one-way clutch. The other element of the clutch is drivingly connected to an annular disk. A non-rotatable brake disk is axially shiftable against the annular disk by an adjustment knob threaded on the opposite end of said shaft, outside the housing, acting on a pressure plate having a series of prongs arranged to pass through suitable openings in the housing to engage and position the brake disk. By rotating the knob, the pressure plate prongs vary the pressure of the brake disk against the annular member which will turn with the spool only in the unwinding direction. A clicker pawl is selectively engageable with teeth on the periphery of the annular disk.

BACKGROUND OF THE INVENTION

At present, reels of the single action type, wherein the brake is connected to the reel by an over-running clutch, employ an adjustable shoe type brake member engaging the periphery of a reel driven disk, or cylinder. Such brake structures do not provide a fine, smooth braking effect.

BRIEF SUMMARY OF THE INVENTION

My reel embodies a structural arrangement which is economical to fabricate and assemble, and includes a brake disk restrained against rotation and yieldingly moved in a direction axially of the reel into engagement with a driven disk operatively connected to the reel through the one-way over-running clutch. The pressure on the brake disk is provided by an adjusting knob threaded on an exposed end portion of the fixed shaft on which the reel is journalled, and there is a compression spring interposed between the adjusting knob and a brake applicator, engaging the brake disk with universal movement for most effective engagement with the driven disk.

BRIEF DESCRIPTION OF DRAWINGS

FIG. 1 is a vertical sectional view of a fishing reel embodying my invention.
FIG. 2 is a view taken on line 2—2, FIG. 1.
FIG. 3 is a view taken on line 3—3, FIG. 1.

DETAILED DESCRIPTION

Figure 4:
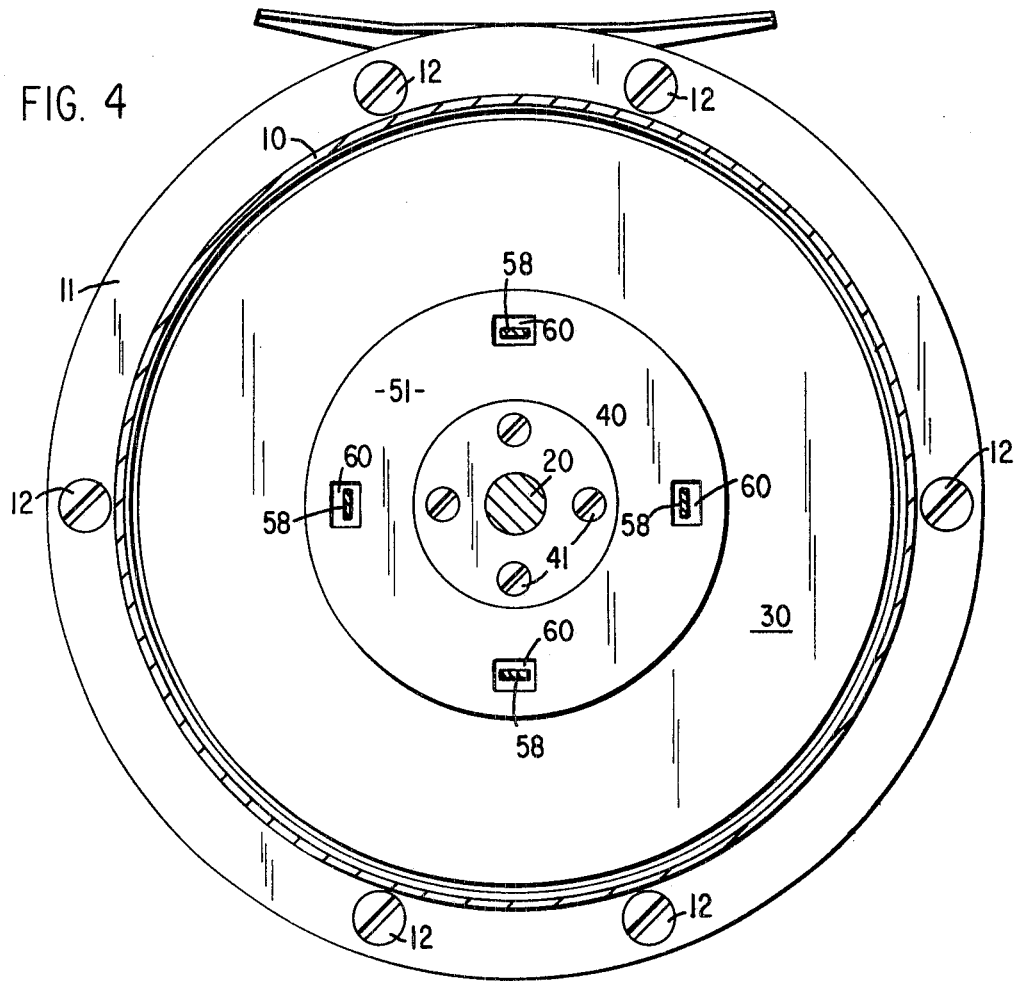
FIG. 4 is a view taken on line 4—4, FIG. 1.

The reel frame includes a circular side wall 10, the peripheral flange portion 11 of which is provided with apertures to receive screws 12 extending through like apertures in a ring member 13 and threading into spacers 14. A second ring member 15 is positioned on the opposite end of the spacers 14 and attached thereto by screws 17.

A shaft 20 is formed intermediate its ends with a radial flange 21 abutting the wall 10 and being affixed thereto by screws 23 extending through the bottom wall of a cup member 25 and apertures formed in the side wall and threading into the flange 21. The shaft 20 accordingly has an end portion extending laterally from each side of the frame side wall 10.

A reel is journalled on one extending portion of the shaft 20. The reel consists of a hub 27 provided with bearings 28, the ends of the hub being fixedly secured to disks 30, one of which is provided with an operating handle 31. This end portion of the shaft 20 is provided with an extension having a head 33 and a necked down portion 34. A slide 35 is mounted in a housing 36 attached to the outer disk 30, the slide being formed with an aperture having a diameter exceeding the head portion 33, whereby the reel may be sleeved onto the shaft 20, and a compression spring 38 move the slide 35 radially to bring one side of the aperture therein against the necked down portion 34. This arrangement provides for mounting and dis-mounting the reel on the shaft 20.

Referring to FIGS. 1 and 3, a disk 40 is apertured centrally to receive the end flange on the inner bearing 28, and is affixed to the reel hub 27 by screws 41. The periphery of the disk is formed with four shoulders 42. A curved surface 43 extends from the outer edge of each shoulder to the bottom of the adjacent shoulder, the arrangement forming arcuate recesses 45, in each of which is positioned a ball 46.

Referring to FIG. 3, the disk 40 is encircled by an annular member 50, on each side of which is mounted an annular plate 51, the plates being secured to the annular member 50, as by rivets 53. The flat rings 51 extend inwardly and overlap the peripheral portion of the disk 40, see FIG. 1.

Referring to FIG. 3 again, if the disk 40 is rotated in a clockwise direction, the balls 46 remain against the shoulders 42. However, if the disk 40 is rotated in a counterclockwise rotation, the balls move in the curved recess 45 and become wedged between the curved surfaces and the bore of the annular member 50. This arrangement constitutes a conventional type of one-way, over-running clutch.

Figure 5:
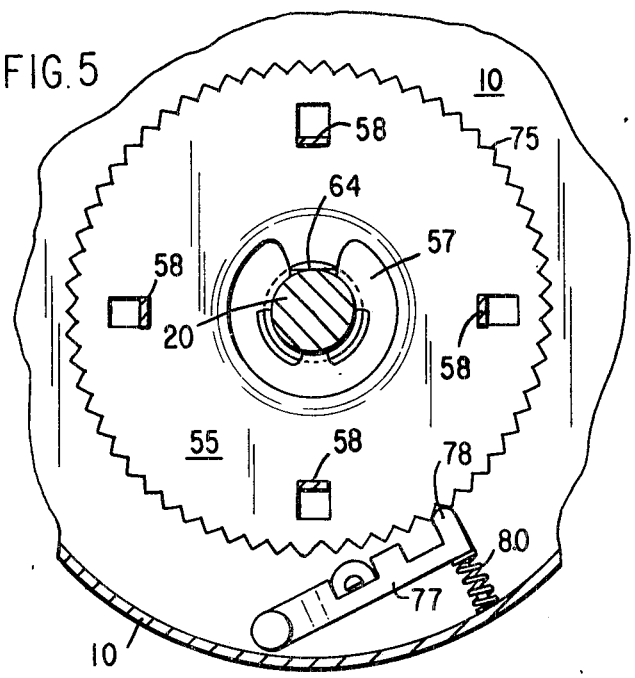
FIG. 5 is a view taken on line 5—5, FIG. 1.

Referring to FIGS. 1 and 5, a disk 55 is mounted for free rotation on the shaft 20 and is positioned intermediate the clutch structure described and the side wall 10. The disk is restrained against axial movement toward the clutch structure by a snap ring 57. The disk 55 is formed with four prongs 58 struck therefrom and which extend in a direction axially of the shaft 20 through rectangular shaped apertures 60 formed in the side members 51 and the inner disk 50 of the clutch structure. Accordingly, the disk 55 has driving connection with these outer driven members of the clutch structure. With this arrangement, when the reel is rotated by the handle 31 to reel in the line, the reel is not clutched to the disk 55. However, when the line is payed off the reel by the running fish, the reel is clutched to the members 50, 51, and accordingly to the disk 55.

A brake disk 63 is mounted on the shaft 20 intermediate the driven disk 55 and the side wall 10. The shaft is formed with a flat area 64, see FIGURE 5, and the brake disk is formed with a complemental D-shaped aperture, whereby the disk 63 is movable axially on the shaft 20 toward and from disk 55, but is restrained against rotation.

A disk 65 is positioned on the opposite extending end portion of shaft 20 externally of the side wall 10. The disk 65 is formed with three prongs 67 which extend through apertures 68 formed in the bottom wall of the cup-shaped member 25, the side wall 10, and the shaft flange 21, and engage the brake disk 63. The apertures 68 are dimensioned larger than the prongs 67. The aperture at the center of the disk is larger than the extending portion of the shaft on which it is mounted.

With this arrangement, the disk 65 has free universal movement and when urged inwardly, the prongs effect axial movement of the brake disk 63 and parallel engagement with the disk 55 for maximum braking force on the disk 55 and reel. A washer 70 of friction material may be interposed between the disks 55, 63. The outer end of the shaft 20 is threaded to receive an adjusting knob 71 which is retained from displacement by screw 72. A compression spring 73 is interposed between the knob 71 and disk 65. It will be apparent, by threading knob 71 inwardly on the shaft 20, a greater braking force is applied to disks 65, 63.

Due to the universal movement of the pressure disk 65, the brake disk 63 is pressed against the driven disk 55 in parallel relationship, effecting maximum braking force and accordingly, this force may be adjusted with fine increments by adjusting the knob 71. The driven disk 55 is formed on its periphery with a series of teeth 75. A pawl 77 is pivotally mounted at one end to the side wall 10. The opposite end of the pawl is formed with a tooth engaging portion 78 yieldingly pressed against the teeth 75 by spring 80.

A shaft 81 is journalled in the side wall 10. A knob 83 is fixed to the outer end of the shaft and the inner end is of D formation, forming a cam portion overlying pawl 77. When the shaft is rotated 90°, the end 78 is moved out of engagement with the teeth 75 on disk 55. This arrangement provides a clicker which may be rendered operative by manipulation of the knob 81 to provide audible indication when the fish is paying the line off the reel.

What I claim is:

1. A fishing reel comprising a frame adapted to be attached to a fishpole and including a side wall, a shaft fixedly mounted intermediate its ends in said side wall with end portions of the shaft extending laterally from opposite sides of said wall, a line reel journalled on one end portion of said shaft, a one-way, over-running clutch structure attached to said reel and including an annular member clutched to said reel upon rotation thereof in one direction, a disk journalled on said shaft end portion intermediate said clutch structure and said side wall and having driving connection with said annular member, a brake disk positioned on said shaft end portion intermediate said driven disk and said side wall, said brake disk being fixed against rotation on said shaft and being movably axially thereof into and out of engagement with said driven disk, a pressure disk mounted on the opposite end portion of said shaft and being formed with a circular series of prongs extending in a direction axially of said shaft through apertures in said side wall and engaging said brake disk, an adjusting knob threaded on said opposite end portion of said shaft, and a compression spring intermediate said knob and said pressure plate and operable to yieldingly urge said pressure disk against said brake disk, and the latter against said driven disk.

2. A fishing reel as set forth in claim 1, wherein said driven disk is provided with prongs extending axially into apertures formed in said annular member.

3. A fishing reel as set forth in claim 1, wherein said driven disk is formed with peripheral teeth, a pawl yieldingly urged into engagement with said teeth, and means operable to move said pawl out of engagement with said teeth.

References Cited

UNITED STATES PATENTS

| 2,306,259 | 12/1942 | Khoenle | 242—84.5 |
| 2,551,309 | 5/1951 | Allison | 242—84.51 |
| 2,984,433 | 5/1961 | Clark | 242—84.5 XR |

FOREIGN PATENTS

| 950,227 | 2/1964 | Great Britain. |

BILLY S. TAYLOR, Primary Examiner

U.S. Cl. X.R.

192—12